United States Patent [19]
Buchanan et al.

[11] Patent Number: 5,991,293
[45] Date of Patent: Nov. 23, 1999

[54] CIRCUIT ARRANGEMENT FOR PROVIDING INTERNET CONNECTIVITY TO A COMPUTER IN A KEY TELEPHONE SYSTEM

[75] Inventors: Chris Buchanan; Dick Keilty; Ron Wellard; Chi-Yin Wong, all of Kanata; Tim Jenkins, Kinburn; Timothy Winston Hibberd, Cremorne, all of Canada

[73] Assignee: Nortel Networks Corporation, Montreal, Canada

[21] Appl. No.: 08/862,303

[22] Filed: May 23, 1997

[51] Int. Cl.[6] .................... H04L 12/66; H04L 12/50; H04L 12/28; H04J 3/16

[52] U.S. Cl. .................... 370/353; 370/264; 370/524; 370/420; 370/468; 379/93.09; 379/93.14

[58] Field of Search .................... 370/259, 263, 370/264, 353, 357, 522, 524, 532, 419, 420, 465, 468; 379/93.14, 442, 93.09

[56] References Cited

U.S. PATENT DOCUMENTS

| | | | |
|---|---|---|---|
| 5,303,239 | 4/1994 | Aoki et al. | 370/410 |
| 5,365,577 | 11/1994 | Davis et al. | 379/93.09 |
| 5,838,682 | 11/1998 | Dekelbaum et al. | 379/93.14 |
| 5,841,840 | 11/1998 | Smith et al. | 379/93.09 |

*Primary Examiner*—Michael Horabik
*Assistant Examiner*—Kevin C. Harper
*Attorney, Agent, or Firm*—Frank P. Turpin; J-P Fortin

[57] ABSTRACT

A circuit arrangement is provided for connecting a personal computer (PC) to a port of a key telephone system via an adapter circuit which also interfaces a digital key set to the port. The adapter circuit is connected to the computer via an RS-232 single channel data link. The PC is programmed to generate and receive a serial data stream into which are encapsulated messages relating to link control and telephone functionality. The adapter circuit is also programmed to receive and generate the serial data stream. The data rate through the adapter circuit and the telephone system and hence to a remote computer is dependent on the utilization of the attached key set by the user to make a call.

9 Claims, 4 Drawing Sheets

| CHARACTER | VALUE | TRANSMITTED AS |
|---|---|---|
| CONTROL-ESCAPE | 0 x 7D | 0 x 7D  0 x 5D |
| FLAG | 0 x 7E | 0 x 7D  0 x 5E |

FIG. 5a

| FLAG | 0 x 06 | ACCESS MESSAGE | LRC | FLAG |
|---|---|---|---|---|

FIG. 5b

| FLAG | 0 x 04 | TYPE | (PARAMETERS) | LRC | FLAG |
|---|---|---|---|---|---|

FIG. 5c

| CHAR |   CHAR ≠ 0 x 7D OR 0 x 7E

| 0 x 7D | CHAR^ |   CHAR = 0 x 7D OR 0 x 7E
                    CHAR^ = CHAR ⊕ 0 x 20

CIRCUIT ARRANGEMENT FOR PROVIDING INTERNET CONNECTIVITY TO A COMPUTER IN A KEY TELEPHONE SYSTEM

FIELD OF THE INVENTION

This invention relates generally to digital key telephone systems and more particularly to a circuit arrangement for allowing a user the simultaneous use of his digital key set and personal computer (PC). An adapter circuit allows data connectivity to a data service such as the Internet network simultaneously with telephone functionality using either the PC or the key set.

BACKGROUND OF THE INVENTION

Generally, very small telephone switching systems have been referred to as key telephone systems. Typically, a key telephone system was provided by extensive telephone line and control lead wiring between the key telephone sets with each telephone line extending to a telephone switching office. Each of the key sets included a plurality of interlocking pushbuttons or keys each for connecting the telephone set to a particular telephone line among a plurality of telephone lines routed to each key telephone set. The switching function of line selection was mechanically provided and distributed among the key telephone sets. The primary advantages of these systems were economy with small size and robustness. However, these early systems were difficult to expand, required extensive cabling, and were not compatible with the emerging world of digital switching and the associated digital communications.

In the late 1980's and 1990's, a new generation of small switching systems were developed to be compatible with the existing world of digital telephony. One of the better-known and most successful of these systems is marketed under the name of Norstar™ by Northern Telecom.

Further information on the Norstar digital key telephone system may be obtained from U.S. Pat. No. 4,873,682 issued Oct. 10, 1989 to G. F. Irwin et al. and U.S. Pat. No. 5,027,345 issued Jun. 25, 1991 to T. J. Littlewood; both patents are assigned to the same assignee as the present application and are hereby incorporated herein by reference. Yet other information on the Norstar system may be obtained from the publication "Telesis" 1989, two, published by Bell-Northern Research, the research arm of Northern Telecom Limited.

The Norstar system interfaces to the public switched telephone network (PSTN) via lines and trunks in the usual manner of a telephone switch. The core of the system named KSU (Key Service Unit) in Norstar, on the other hand, is connected to proprietary digital key sets via time-compression multiplex (TCM) links each carrying a pair of B-channels B1 and B2 at 64 kb/s and a D-channel at 16 kb/s.

The KSU can also be connected to a personal computer (PC). The physical and logical connection between a PC and the Norstar system is provided by a proprietary PC interface card that occupies one standard PC bus slot. A PC thus equipped can be connected to a Norstar system via a standard TCM port on the KSU. Firmware in the PC interface card provides PC applications with access to both D-channel functional messaging and B-channel data. The PC communicates with the card via interrupts for the D-channel and direct memory access for large data transfer associated with the B-channel traffic.

The Norstar system also provided for the connection of a PC and digital key set to a TCM port of the switch. A coupling device was inserted in the TCM path between the KSU and a digital station set to provide an interface to the TCM loop, a D and B1-channel interface to the station set and a B2-channel interface to an RS-232 link to a PC. The device included a modem to interface the B-2 channel to the PC. The device thus allowed the use of the PC to make data calls on the B2-channel and the use of a key set to make voice calls on the B1-channel.

The desirability of connecting both a telephone station set and a PC to a common port of a switching system is well recognized and is exemplified by numerous patents in addition to the Norstar system mentioned above.

For example, U.S. Pat. No. 5,003,580 to D. M. Duong describes an adapter for interfacing a work station terminal to a key telephone system. The adapter comprises a pair of interface circuits and a pair of relays for variously switching them to the work station or the station set.

U.S. Pat. No. 4,689,814 also describes an external device for interfacing an external device such as a PC and an electronic telephone to a switching system. This device also uses a switching module comprising relays to switch the lines from the ports on the switch to the external devices. The switching module uses a resistor network to mute the audio signal to the telephone set when an external device is actuated.

The above and other similar patents therefore indicate that it is known to provide an adapter device for interfacing a telephone station set and a personal computer to a telephone line from a switching system. It is also known to provide a PC programmed to function cooperatively with a station set so that it may be used to initiate telephony functions. However, the known devices are not adapted to provide simultaneous telephony functionality and data connectivity such as to the Internet network, and an attached set.

SUMMARY OF THE INVENTION

It is an object of this invention to provide an adapter circuit for providing the simultaneous use of telephony functions and access to data services such as the Internet network over a single serial link connecting a PC and the adapter circuit.

It is a further object of this invention to provide an adapter circuit for connection between a TCM port of a key telephone system and a personal computer whereby the connection between the computer and the adapter circuit is a single serial link that provides simultaneous telephone signaling and data communication capability.

It is also an object of this invention to provide an adapter circuit for connection between a TCM port of a key telephone system, a personal computer and a key set whereby the adapter circuit behaves as a high-speed modem between the PC and a remote computer and wherein the arrangement provides the capability for simultaneous telephone functionality and data connectivity to the remote computer.

The invention therefore, according to a first aspect, provides a circuit arrangement for providing simultaneous telephone functionality and data connectivity to a personal computer (PC) connected to a key telephone system, the system including a key service unit (KSU) and a plurality of digital key sets, the PC being connected to a port of the KSU and to one of the digital key sets via an adapter circuit, the port being adapted to carry a pair of data channels (2B) and a signaling and control channel (D) to provide a 2B+D TCM link, the circuit arrangement comprising:

an adapter circuit having a first TCM port for connection to the port of the KSU, a second TCM port for connection to the digital key set and a third port for connection to the PC, the third port comprising a first circuit for interfacing to single channel serial data;

a PC suitably programmed to provide telephone functionality by generating and responding to telephone signaling and control data and to provide data generation and reception functionality, the PC comprising a second circuit for interfacing to single channel serial data port and being further suitably programmed to multiplex and demultiplex data generated in the realization of the telephone and data functionalities for generating a single channel data stream suitable for transmission between the first and second interfacing circuits in accordance with a predetermined protocol;

the adapter circuit further comprising a processor, control circuitry, and a multiplexor/demultiplexor circuit for multiplexing TCM data to single channel serial data and demultiplexing single channel serial data to TCM data, in accordance with the predetermined protocol, the control circuitry being responsive to commands from the processor to route signaling data to and from the key set and the PC to the KSU and to always route one of the B-channels to the key set when it is in use and to otherwise connect both B-channels to the PC.

From a second aspect, the invention provides a method of providing telephony and data connectivity between a personal computer (PC) and a 2B+D channel TCM port on a key telephone system, the PC being suitably programmed to provide telephony functions as well as data handling functions including telephone line dialing capability and having an interface circuit to a single channel serial data port, the arrangement further comprising an adapter circuit including a controller and having first circuit means for interfacing to a signal path connected to the TCM port on the key telephone system second circuit means for connection to a key set, the interfacing circuit means providing access ports corresponding to a D-channel, a B1-channel and a B2-channel, the adapter circuit also having an interface circuit for a single channel serial data port, the serial data ports of the PC and the adapter circuit being connected by a serial communications link, the method of the invention comprising the steps of:

in the adapter circuit, multiplexing the data on the D and B-channels into a single channel serial data stream using a predetermined protocol and demultiplexing the received serial data stream into D and B-channel data;

in the PC, demultiplexing the serial data stream to reconstitute the 2B+D data, and multiplexing the 2B+D data generated in the PC for transmission on the serial communications link; and wherein the controller of the adapter is suitably programmed to recognize functional signaling corresponding to requested use by a user of voice functionality, and in response thereto, forward the signaling to the key system on the D-channel and switch the allocation of one of the B-channels from use by the PC to use by the set.

From yet a third aspect, the invention further provides a circuit arrangement for providing simultaneous telephone functionality and data connectivity between a personal computer (PC) and a time compression multiplex (TCM) port on a key telephone system, comprising:

an adapter circuit comprising a controller circuit and having circuit means for interfacing to a TCM signal path connected to the TCM port on the key telephone system, the TCM path for carrying 2B+D channels of data, the interfacing circuit means being controlled to decompose and recompose the TCM signal to provide signals corresponding to a D-channel, a B1-channel and a B2-channel on respective data ports thereof, the adapter circuit also comprising, a serial port interface circuit, and a multiplexor/demultiplexor circuit for translating the 2B+D channel data to a single channel data stream under control of the controller circuit;

a PC suitably programmed to provide telephony functions as well as data handling functions including telephone line dialing capability, the PC comprising an interface circuit for a single channel serial data port and being further suitably programmed to multiplex and demultiplex data generated for the telephony functions and for the data handling functions to and from a data stream on the single channel serial data port; and a serial data link for connecting the single channel serial data port interface circuit of the PC to the serial port interface circuit of the adapter circuit.

BRIEF DESCRIPTION OF THE DRAWINGS

Embodiments of the invention will now be described with reference to the accompanying drawings, in which.

Figure 1:
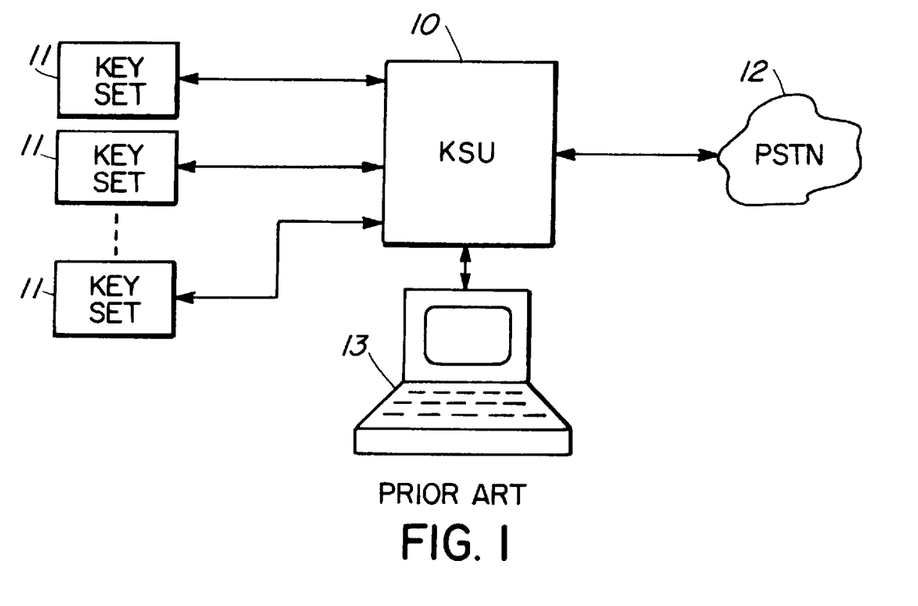
FIG. 1 is a very generalized illustration of a contemporary key telephone system.

FIG. 1 illustrates a very general architecture of a key telephone system such as the Norstar system. It consists of a Key System Unit (KSU) 10 connected to a plurality of proprietary digital key sets 11. The KSU contains the common system components such as power, control and a non-blocking time switch. It also provides interfaces for connection to the public switched telephone network 12 and may be connected to a personal computer 13 as described below. The processor and memory requirements for the KSU 10 are conventional and may use commercial processors as described in the above-identified patents and publication about the Norstar system. Read-only memory (ROM) holds the system software and non-volatile memory (NVRAM) is provided to hold permanent data such as configuration tables and settings of user preferences.

Each Norstar key set 11 is connected to the KSU 10 over a single twisted pair. This connection is fully digital using time compression multiplex (TCM) to carry two 64 kb/s B-channels and one 16 kb/s D-channel (2B+D), thus providing an ISDN-compatible data link. The B-channels carry digitally encoded speech or data and the D-channel carries control and signaling messages. In TCM, bursts of data are transmitted in "ping-pong" fashion every 125 microseconds between the KSU 10 and a key set 11. Each burst contains 23 bits—a start bit, a balance bit, a stop bit, and 20 bits for voice, data and signaling channels. Delay and guard times prevent interference between the receive and transmit bursts in the transceivers at the end of each loop. The delay time is limited by the maximum loop length to be covered.

The provisioning of 2B+D bandwidth to every key set 11 supports enhanced telephone terminal design and functionality. For example, each Norstar station set has a character display which, by means of the associated D-channel, offers simplified access to system features, administration and configuration. The displays, sometimes in conjunction with context sensitive keys or softkeys, facilitate feature activations, present call status and feature information, confirm when operations have been correctly executed and identify and help to resolve invalid operations.

The Norstar software structure operates as a number of independent tasks which operate in parallel and communicate by means of a broadcast message system. There is an independent task for each line and terminal plus some service tasks which manage shared equipment and configuration data. Messages between tasks are known as Functional Messages. Tasks may run on the KSU processor in a round robin timeshared manner, or may run on any terminal which has sufficient processing capacity. With appropriate interfaces and software, a PC can act as a terminal and run tasks which interact with the system; this is described in detail in the aforementioned references.

Underlying the task structure are programs to support the message system, allocate KSU processor time between the various tasks and communicate with the system hardware. Central to this operation is a program called the Message Agent (MA). When a task generates a message, the message is sent to the MA and placed in a queue. Tasks running on the KSU processor can pass messages directly to the MA; tasks running on a terminal send their messages over the D-channel.

When a message reaches the head of the queue, the MA submits the message to each task running on the KSU processor. It also arranges for the message to be transmitted over the D-channel to all attached terminals. Thus a message generated by one task is broadcast to all other tasks whether these tasks operate on the KSU processor or on the terminals themselves.

A terminal control task which runs on the KSU processor is known as an Emulator. Logically, there is no difference between an emulator and a task running in a terminal; both perform similar functions and communicate with other tasks by means of broadcast messages. However, an emulator must also communicate with the hardware of its associated terminal; that function is performed using special messages called Stimulus Messages (SM). SMs are not broadcast, but are treated specially by the messaging software and transmitted directly between an emulator and its associated terminal. In most cases, stimulus messages correspond to elementary terminal actions such as reporting keystrokes or activating indicators or audible signals.

In Norstar, each terminal and line is controlled by an independent software task. Tasks communicate by means of functional messages which are in a defined format and occur in a defined sequence. Each task and associated terminal is identified by a unique station index.

The sequence to set up a simple terminal to terminal call results in two tasks agreeing to communicate; however, no speech path has yet been set up between the corresponding sets. Each task now sends a message to a service program which runs in the KSU. The service program sends control signals to the timeswitch devices which implement the required B-channel connections.

The sequence to set up a terminal to terminal call is largely independent of user interfaces and features. The needed keystrokes, displays and ultimate responses are all handled by the control tasks of the sets. Norstar terminals implement a variety of features, each associated with a specific feature code. Users may dial the code directly or program a key on the set to generate the code and invoke the feature. In most cases, the feature code will be acted upon directly by the controlling task of the terminal concerned. However, if an unallocated code is generated, the task will broadcast a message to that effect and if an appropriate server task is present in the system, it can respond and engage in ongoing dialog with the terminal control task and thus, indirectly, with the user. This intervention is known as X-Feature operation. Such server tasks may exist in other terminals, in the KSU or in personal computers attached as terminals to a Norstar system.

Figure 2:
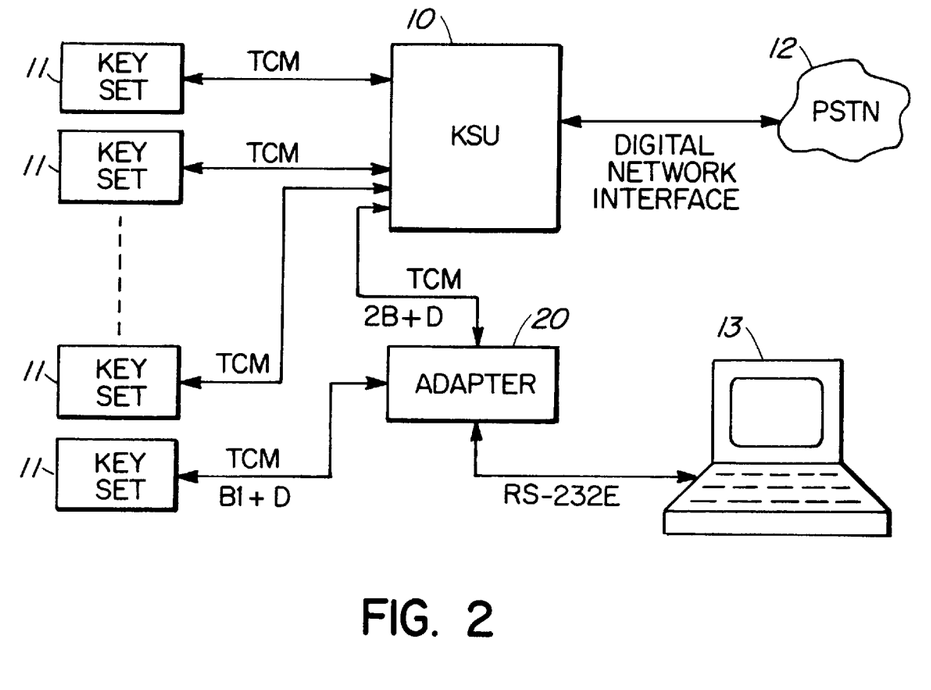
FIG. 2 is a block diagram of a circuit arrangement in accordance with the invention.

FIG. 2 shows a circuit arrangement in accordance with the invention. A KSU 10 is shown connected to the PSTN 12 via a digital network interface as for example an ISDN link, and to a plurality of proprietary digital key sets 11 by respective TCM links. Also shown is an adapter circuit 20 having a first port connected via a TCM link to a port of the KSU 10, a second port connected to a digital key set 11 via a partial (B1+D) TCM link and a third port connected to a PC 13 via a standard RS-232E link. The RS232E link is adapted to carry a single channel data stream in accordance with the standard: TIA, EIA/TIA-232E, Interface Between Data Terminal Equipment and Data Circuit-Terminating Equipment Employing Serial Binary Data Interchange. In order to accommodate this facility, each end of the link is therefore connected to a standard physical interface circuit as is well-known.

Figure 3:
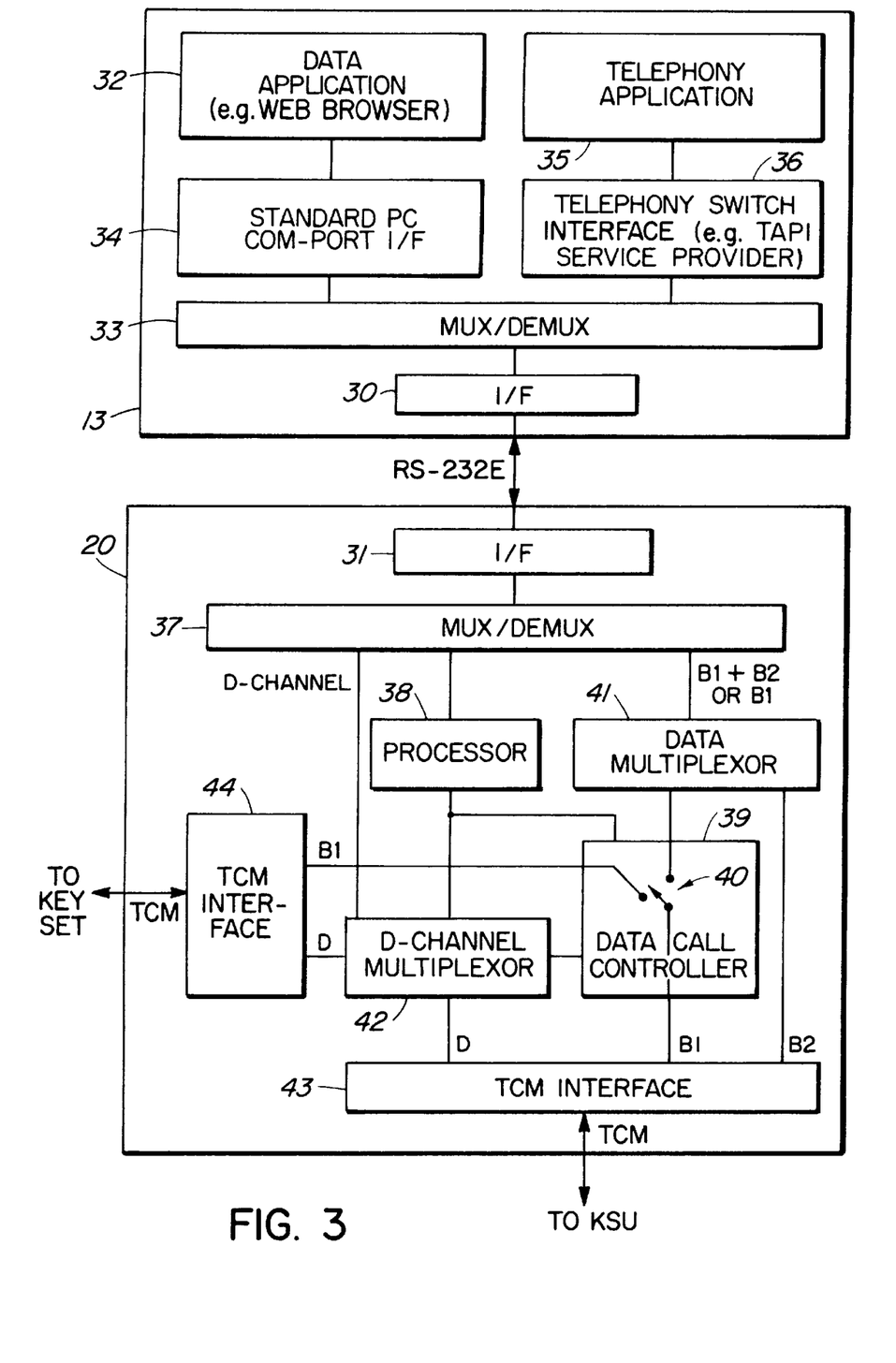
FIG. 3 is a block diagram of a portion of the arrangement of FIG. 2 illustrating the functional circuit blocks therein.

FIG. 3 illustrates the functional blocks of the PC 13 and the adapter circuit 20 necessary to realize the invention. Each end of the RS-232E link is shown connected to a respective one of standard interface circuits 30 and 31; each of these may be embodied as universal asynchronous receiver/transmitter (UART).

The PC 13 comprises a pair of parallel software applications, both of which are well known in the art. A first one is a data application (e.g. Web Browser) 32 such as may, for example, be used to interface interactively with another computer or data terminal via the internet network. The data application is interfaced to a multiplexor/demultiplexor 33 via another standard software program 34 that provides a standard PC Communication Port Interface. A second software application 35 provides telephone functionality to the PC 13 and is interfaced to the multiplexor/demultiplexor 33 via a Telephony Switch Interface application 36 also well-known in the art. A typical example of such a switch interface capability is the Telephony Switch Provider (TAPI SP) which supports the Microsoft Telephony Services standard—a standard managed by the Microsoft Corporation. The telephony functionality on a computer is commonly referred to as Computer Telephone Integrated (CTI) software. The CTI software includes telephone functions such as call control (e.g. initiate calls and conference calls) and call monitoring such as may be used call center applications. The functions are initiated by functional signaling messages sent to the adapter circuit 20 as described below. The telephony switch interface 36 handles the access data stream required for this functionality. Each of the software interfaces 34 and 36 in effect provide a respective virtual port from which the multiplexor 33 receives and prepares a single channel data stream suitable for transmission between the interface circuits. Since the data from each of the virtual ports must be distinguishable from one another, the multiplexing is achieved using a predetermined protocol as discussed below. The multiplexor/demultiplexor 33 may be implemented in software, for example, as a Windows Dynamic Load Library unit.

The adapter circuit 20 is adapted to be connected to a TCM port of the KSU 10 via a TCM interface circuit 43 which translates the 2B+D data of the TCM link from the KSU 10 to separate B1, B2, and D-channel data streams. As described above, the D-channel carries signaling and control data at 16 kb/s whereas each of the B-channels carries 64 kb/s data. The adapter circuit is also adapted to be connected to a digital key set via a TCM interface circuit 44 which translates D-channel signaling data and B1-channel voice data into a TCM data stream. In this embodiment, the TCM interface circuits 43 and 44 may conveniently be integrated circuit chips C84 and A42 respectively; these circuits were previously utilized in the Norstar system and are described in the aforementioned documents. A multiplexor/demultiplexor 37 is connected to the interface circuit 31 and functions in a manner identical to multiplexor/demultiplexor 33; it may therefore be implemented using similar software.

The adapter circuit 20 includes a processor 38 suitably programmed for controlling the operation of the adapter circuit as described below. A D-channel multiplexor 42 is connected between multiplexor/demultiplexor 37, a D-channel port to the key set and a D-channel port to the KSU; it merges D-channel traffic to and from the KSU to the PC telephony software, the attached key set and a data call controller 39. The data call controller 39 monitors the D-channel traffic on the D-channel multiplexor 42 to identify calls being directed to the key set or calls being originated by the user. In response to voice call origination activity, the controller 39 connects the B1-channel from the KSU to the B1-channel of the key set using a switch shown symbolically at 40 as a mechanical switch. Of course, this function is actually realized using an electronics switch of conventional design. A data multiplexor 41 functions to prepare the data for the multiplexor/demultiplexor 37. Depending on the use of the key set, the data multiplexor receives and sends either B1+B2 (128 kb/s) data or only B2 (64 kb/s) data. The data handling within the multiplexor 41 conforms with the "PPP Multilink Protocol (MP)", RFC 1990, UCB/Lloyd Internetworking/Newbridge Networks Corporation/Sidewalk Software, August 1996.

As is evident from the above description, the serial data stream on the RS-232E link between the PC 13 and the adapter circuit 20 contains data related to both telephony and data functionalities. Depending on the use of the key set, the data stream to a remote computer or data terminal may be 64 kb/s or 128 kb/s. It is therefore necessary to structure the data stream in accordance with a protocol that ensures the recognition by the multiplexors/demultiplexors 33 and 37 of the various types of data.

Figure 4:
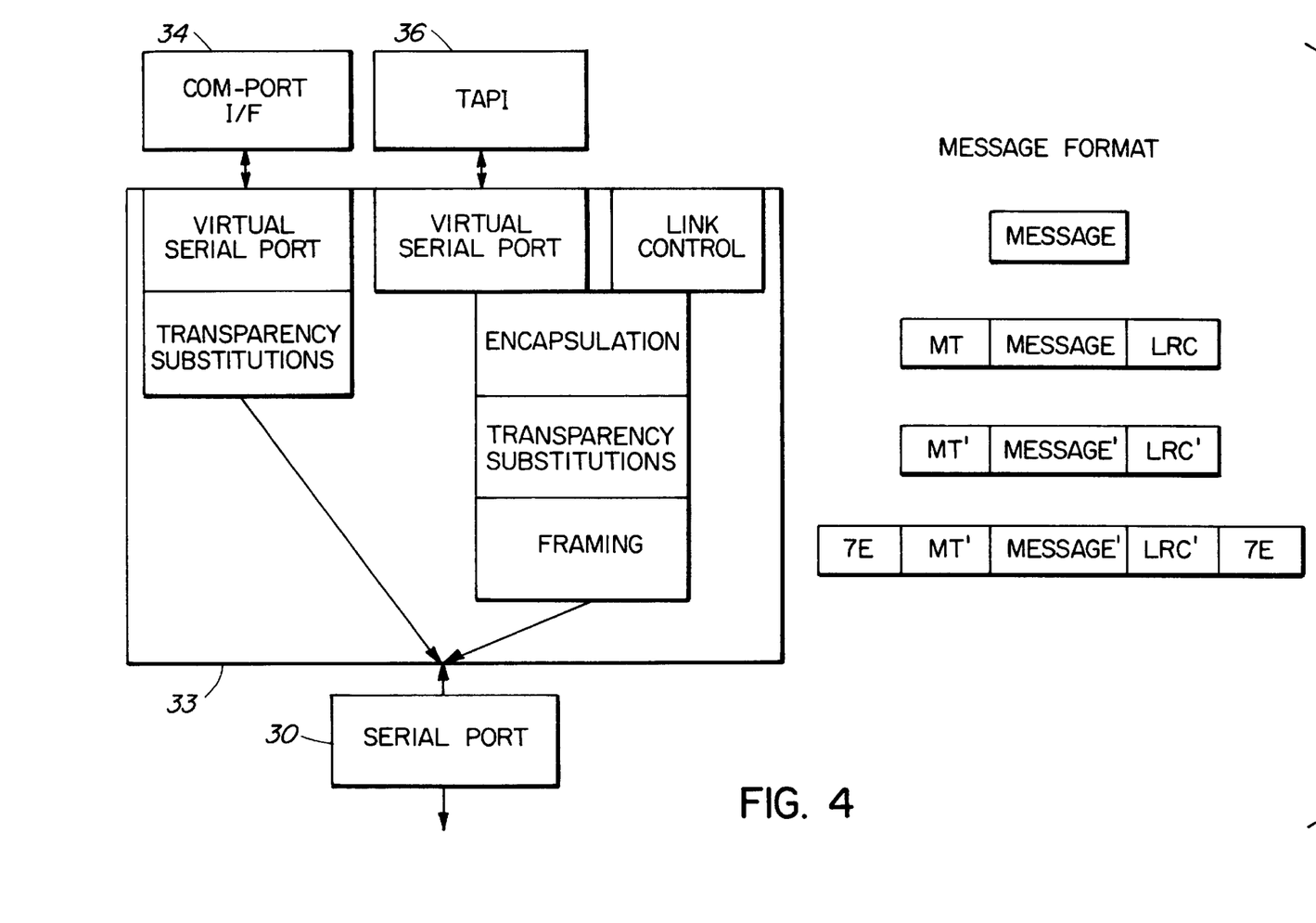
FIG. 4 is a functional block diagram and message format illustrating the software structure used in the generation of the single channel data stream.

Three separate data streams are defined that can cross the serial link; these are the raw data stream, the access stream and the link control stream. The data stream is transmitted as a byte stream having the access stream and the link control stream encapsulated therein. FIG. 4 illustrates the software structure and functioning of the multiplexor/demultiplexor to achieve the RS-232E compatible data stream for transmission by the serial port 30.

The data application 34 and the telephony application 36 each communicate with a respective virtual serial port of the mux/demux 33. The term "virtual serial port" is not meant to imply a particular implementation; it simply indicates that the software above the mux/demux 33 believes that it is communicating in a normal manner over a serial interface of the computer. As shown in FIG. 4, the messages are put through processes of encapsulation and framing. All streams go through a process of transparency substitution to allow flags to be used to delineate the complete messages from the applications. Of course, the same data handling functionality is present at each end of the data link.

Encapsulation is used to distinguish message types within the message based streams and to provide a degree of error detection. On transmission, a single byte value is added to the front of the message; the value of the byte depends on the message type (MT). On reception, this byte is stripped from the message and used to determine the destination of the message. Additionally, a checksum in the form of an LRC (longitudinal redundancy check) is added to the message for transmission. This can be checked on reception to determined if errors occurred during transmission. The LRC is an eight bit value and is calculated on the entire message including the message type such that the successive exclusive-ORing of all bytes is zero, including the LRC. Of course, other types of error detection mechanisms could be employed without departing from the concept and spirit of the invention.

Two message type values are specified in this example embodiment; the value Ox04 is used for link control messages and Ox06 is used for access messages. Other values can of course be used for other types of messages.

Figure 5A:
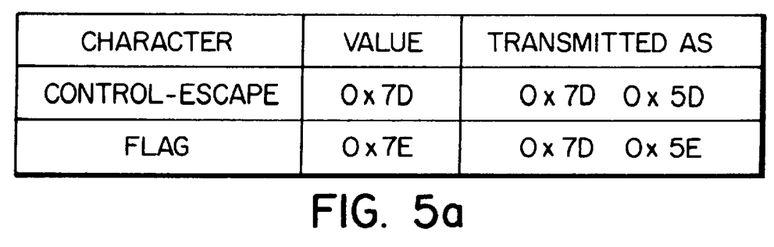
FIGS. 5a, 5b, 5c and 5d are tables illustrating message formatting for transparency substitutions and various message types.

Transparency is required to allow flag characters to be used as message delimiters for the access and link control streams. The transparency substitution process is shown in the Table of FIG. 5A. This process is similar to that used for the Point-to-Point Protocol (PPP) over octet-synchronous links. Further information on PPP may be obtained from the articles "PPP in HDLC-like Framing, RFC 1662, Daydreamer, July 1994" and "The Point-to-Point Protocol (PPP), RFC 1661, Daydreamer, July 1994".

In data to be transmitted, including the raw data from the data applications, all occurrences of the flag character and a character called the control-escape character are replaced with a two-character sequence consisting of the control-escape character and the escape character exclusive-ORed with Ox20.

Framing of a message is achieved by the addition of a flag character Ox7E to the beginning and the end of the message to be transmitted. Shared flags cannot be used between encapsulated messages since the data stream is not encapsulated.

Figure 5B:
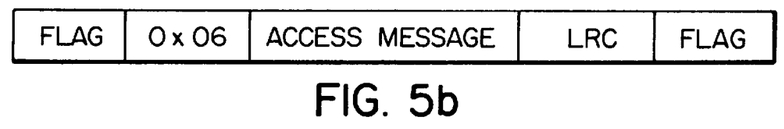

FIG. 5b illustrates the encapsulation and framing of access messages. All D-channel messages received without error from the KSU are encapsulated, passed through for transparency, framed and then transmitted on the serial data link. All messages received at the adapter circuit 20 on the serial data link as part of the access stream are striped of flags and have their transparency and encapsulation removed before being sent to the KSU. The message itself is not checked and is assumed to be a valid D-channel stimulus or functional message.

Figure 5C:
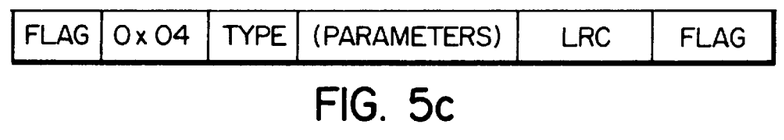

FIG. 5c illustrates the format of a link control message. The link control stream comprises link control messages that are encapsulated and framed. They are used to configure the link between the adapter circuit 20 and the PC 13.

The type field is an 8-bit byte defining the link control message function. Parameters sent depend on the message sent and the parameter field length depends on the message type; it is always fixed for each message type and can be zero. The various link control messages will be described without value definitions as these are generally arbitrary.

Acknowledgement Message

This message is used by the adapter circuit 20 to acknowledge the reception of a link control message from the PC 13 that normally would require no response. The parameter field contains the type field of the message that was received and acted upon and is a length of one. A parameter field of 0x00 indicates that a message was received in error, and is therefore the equivalent of a negative acknowledgement. An unsupported message by the adapter circuit 20 is treated as a message with an error, and will receive a negative acknowledgement in response. The DLL will have no way of telling if a line error occurred or if the message is unsupported, except by repeated attempts of the same message.

Set Link Rate

This message is used by the PC 13 to set the rate of the serial port link. If the message is received properly by the circuit, it responds with an Acknowledgement message at the original port rate. Immediately after sending the message, the adapter circuit changes its port rate to that specified in the original command.

Query Hardware ID

This message is used by the PC 13 to retrieve the adapter circuit's internal hardware ID; in response, it sends the Hardware ID message.

Hardware ID

The message returns the adapter circuit's hardware ID in response to Query Hardware ID message. The parameter of this message is a 40-bit hardware ID of the adapter circuit.

Bad KSU Message Indication

When the adapter circuit detects a bad message from the KSU, a message indicating this is sent to the PC. No indication of the type of error or the possible message type is provided. There is no response expected from this message, so no recovery is possible if there was an error in transfer of this message. This message is provided so that error logs may be kept.

Bad Key Set Message Indication

When the adapter circuit detects a bad message from the attached key set, a message indicating this is sent to the PC. No indication of the type of error or the possible message type is provided. There is no response expected from its message, so no recovery is possible if there was an error in transfer of this message. This message is also provided so that error logs may be kept.

Capabilities and Status Parameter Format

The parameter used by the Capabilities, Enable Capabilities and Status link control messages is a single byte representing a bit map. All bits are active high for both capability, enabling and status where appropriate. Each bit is used to indicate a particular status or capability such as key set interface being attached, frame synchronization status, rate adaptation availability, one or both B-channel availability and other optional capabilities.

Query Capabilities

This message is used to allow the PC to query the capabilities of the adapter circuit's current firmware load. It expects the Capabilities message to be returned.

Capabilities

This message is used to indicate the capabilities of the adapter circuit's current firmware load; it is sent in response to the Query Capabilities message.

Enable Capabilities

This message is used by the PC to enable and disable the capabilities of the adapter circuit. Upon successful completion of the command, the Acknowledgement message is sent to the PC. Failure to complete the command results in a negative acknowledgement message sent to the PC. An attempt to enable an unsupported capability is ignored, and will not return a negative acknowledgement.

Query Status

This message is used to allow the PC to query the current status of the adapter circuit. It expects the Status message to be returned.

Status

This message is used to indicate the status of the adapter circuit and is sent in response to the Query Status message.

Break Start

This message is sent to indicate that a break character has been inserted into the data stream path. The break condition exists until the Break End message is received. This message can be sent in either direction by applications or rate adaptation protocols that support it.

Break End

This message is sent to indicate that a break character that was previously inserted into the data stream path is now removed. It is ignored if there was no previous Break Start character. This message can be sent in either direction by applications or rate adaptation protocols that support it.

Figure 5D:
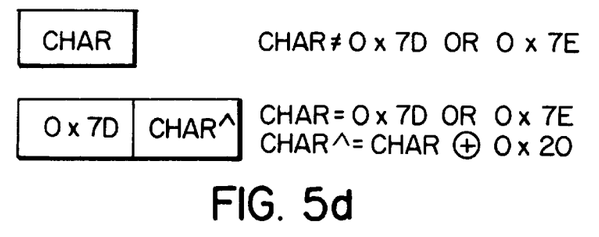

FIG. 5d illustrates the data stream format of the raw data from the data virtual serial port. The data is treated for transparency but is not encapsulated or framed. The data appears between messages encapsulated by flag characters. When the Point-to-Point format is used over the message stream, characters escaped in the PPP message will result in two escapes being generated. One of the escapes is removed by the interface multiplexors whereas the second one is removed by the PPP implementation.

The operation of the circuit arrangement will now be described briefly with particular reference to FIG. 3 and FIG. 6. Under quiescent operation, the adapter circuit 20 interfaces a key set to a KSU, the mux/demux 37 and 33 are not used and are not aware of each other's existence. It is up to the access application in the PC 13 to install or energize its interface software to the serial data link. This is done either when the PC starts up or the interface software is installed; otherwise the interface software is running all the time. The interface software takes over the use and control of the serial data port and provides the two virtual serial ports for the data and access applications. Through an exchange of data link messages, the PC requests the interface circuitry of the adapter circuit to become active resulting in the respective interfaces of the PC 13 and the adapter circuit 20 being in the data stream mode. If a first attempt at reestablishing the serial data link fails, the PC will try further attempts after ascertaining that the set-up conditions are in place. The PC interface software establishes the status of the adapter circuit 20 through the use of a query-response mechanism using standard AT-commands well-known in the art. The routing of received data and messages at each end of the data link depends on the detection of the flag characters that are used to frame access, link control and other types of messages as well as synchronization on the link.

Figure 6:
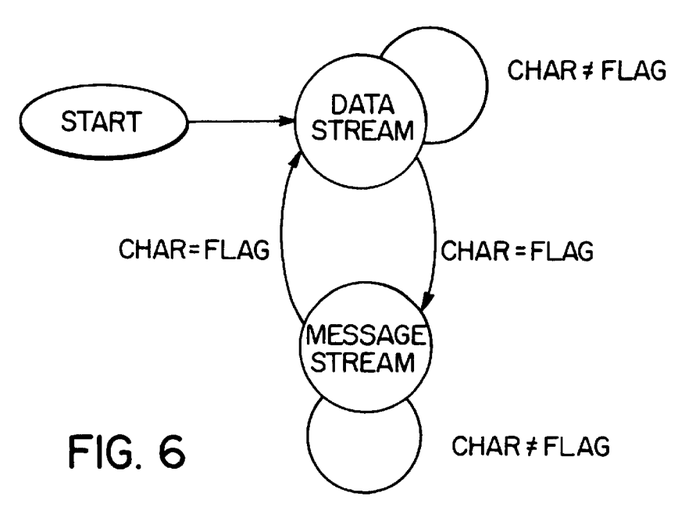
FIG. 6 is a state machine depicting the operation of the multiplexor/demultiplexors used at each end of the serial data link shown in FIG. 3.

FIG. 6 illustrates a multiplexer/demultiplexer receiver state machine. The initial state of the receivers is to assume that it is not in a message state. When it is not in a message state, all received characters are considered data bytes. However, the reception of a flag character causes all characters received subsequently, until the next flag character, to be considered part of a message. The first character after the flag character indicates the destination of the message. After the second flag is received, the next character is assumed to be data unless it is another flag character.

At the termination of a data session on the serial data link, the interfaces are set to idle and may be reactivated by initialization by the PC interface software using a query-response mechanism as mentioned above.

As may be realized from the above description, the circuit arrangement of the invention provides the capability to a user on the switch to access data services such as internet network service providers. Since the circuit arrangement acts like a high-speed modem and provides a data stream compatible with ISDN, it results in lower equipment cost and a higher data rate than that obtained by use of a modem. Since the circuit uses a serial port, it is platform independent and can be implemented on PCs, Macintoshes and other computers; it is also compatible with all software adapted to function through a serial port and with the commonly used extended Hayes AT-conmand set.

It will of course be recognized that the invention can be realized using variations of the circuit arrangement described above without departing from the scope and spirit of the invention.

We claim:

1. A method of providing telephony and data connectivity between a personal computer (PC) and a 2B+D channels TCM (Time Compression Multiplex) port on a key telephone system, the PC being suitably programmed to provide telephony functions as well as data handling functions including telephone line dialing capability and having an interface circuit to a single channel serial data port, the system further comprising an adapter circuit including a controller and having first circuit means for interfacing to a signal path connected to the TCM port on the key telephone system, second circuit means for connection to a key set, the interfacing circuit means providing access ports corresponding to a D-channel, a B1-channel and a B2-channel, the adapter circuit also having an interface circuit for a single channel serial data port, the serial data ports of the PC and the adapter circuit being connected by a serial communications link, the method comprising the steps of:

in the adapter circuit, multiplexing the data on the D and B channels into a single channel serial data stream using a predetermined protocol and demultiplexing the received serial data stream into D and B-channel data;

in the PC, demultiplexing the serial data stream to reconstitute the 2B+D data, and multiplexing the 2B+D data generated in the PC for transmission on the serial communications link; the method comprising the further steps of:

the adapter circuit recognizing functional signaling corresponding to requested use by a user for a voice call;

in response to the recognition, forwarding the signaling to the key system on the D-channel of the TCM link thereto; and on establishment of the requested voice call, allocating one of the B-channels to the voice call.

2. A method as defined in claim 1 wherein if a data call is established during a voice call, the data call is allocated to the other B-channel.

3. A method as defined in claim 2 wherein if a voice call terminates while a data call is in progress, the one B-channel that was used for the voice call is also allocated to the data call.

4. A method of providing telephony and data connectivity between a personal computer (PC) and a 2B+D channels TCM (Time Compression Multiplex) port on a key telephone system, the PC being suitably programmed to provide telephony functions as well as data handling functions including telephone line dialing capability and having an interface circuit to a single channel serial data port, the system further comprising an adapter circuit including a controller and having first circuit means for interfacing to a signal path connected to the TCM port on the key telephone system, second circuit means for connection to a key set, the interfacing circuit means providing access ports corresponding to a D-channel, a B1-channel and a B2-channel, the adapter circuit also having an interface circuit for a single channel serial data port, the serial data ports of the PC and the adapter circuit being connected by a serial communications link, the method comprising the steps of:

in the adapter circuit, multiplexing the data on the D and B channels into a single channel serial data stream using a predetermined protocol and demultiplexing the received serial data stream into D and B-channel data;

in the PC, demultiplexing the serial data stream to reconstitute the 2B+D data, and multiplexing the 2B+D data generated in the PC for transmission on the serial communications link;

the adapter circuit responding to the establishment of a data call by allocating one and the other of the B-channels to the call; the method comprising the further steps of:

the adapter circuit recognizing functional signaling corresponding to requested use by a user for a voice call;

in response to the recognition, forwarding the signaling to the key system on the D-channel of the TCM link thereto; and on establishment of the requested voice call, allocating one of the B-channels that was being used for the data call to the voice call.

5. A circuit arrangement for providing simultaneous telephone functionality and data connectivity between a personal computer (PC) and a time compression multiplex TCM) port on a key telephone system, comprising:

an adapter circuit comprising a controller circuit and having circuit means for interfacing to a TCM signal path connected to the TCM port on the key telephone system, the TCM path for carrying 2B+D channels of data, the interfacing circuit means being controlled to decompose and recompose the TCM signal to provide signals corresponding to a D-channel, a B1-channel and a B2-channel on respective data ports thereof, the adapter circuit also comprising:

a serial port interface circuit and a multiplexor/demultiplexor circuit for translating the 2B+D channel data to a single channel data stream under control of the controller circuit;

a PC suitably programmed to provide telephony functions as well as data handling functions including telephone line dialing capability, the PC comprising an interface circuit for a single channel serial data port and being further suitably programmed to multiplex and demultiplex data generated for telephony functions and for data handling functions to and from a data stream on the single channel serial data port; and a serial data link for connecting the single channel serial data port interface circuit of the PC to the serial port interface of the adapter circuit;

wherein messages of various types are encapsulated in the serial data stream between the PC and the adapter circuit and wherein the encapsulation is achieved by framing each message with a flag character at the beginning and end thereof.

6. A circuit arrangement as defined in claim 5 wherein all occurrences of a flag character and a control-escape character are replaced with a two-character sequence consisting of the control-escape character and the escaped character exclusive-ORed with a predetermined byte value thereby allowing the flag characters to be used as message delimiters for the messages in the raw data stream while providing transparency for control bytes within the messages.

7. A circuit arrangement as defined in claim 6 wherein each message is provided with a data field corresponding to the type of message.

8. A circuit arrangement as defined in claim 7 wherein each message contains a checksum byte for determining the correct reception of the message.

9. A circuit arrangement as defined in claim 8 wherein the checksum byte is in the form of a longitudinal redundancy check.

* * * * *

UNITED STATES PATENT AND TRADEMARK OFFICE
CERTIFICATE OF CORRECTION

PATENT NO. : 5,991,293
DATED : November 23, 1999
INVENTOR(S) : Chris Buchanan, Dick Keilty, Ron Wellard, Chi-Yin Wong, Tim Jenkins, Timothy Winston Hibberd It is certified that error appears in the above-identified patent and that said Letters Patent is hereby corrected as shown below:

ON THE TITLE PAGE:

Delete:

[75] Inventors: Chris Buchanan; Dick Keilty; Ron Wellard; Chi-Yin Wong, all of Kanata; Tim Jenkins, Kinburn; Timothy Winston Hibberd, Cremorne, all of Canada Insert Item [75] Inventors: Chris Buchanan; Dick Keilty; Ron Wellard; all of Kanata; Canada; Chi-Yin Wong, Millbrae, CA; Tim Jenkins, Kinburn, Canada; Timothy Winston Hibberd, Cremone, Australia --

Signed and Sealed this

Tenth Day of October, 2000

Attest:

Q. TODD DICKINSON

*Attesting Officer*    *Director of Patents and Trademarks*